INVENTORS
William K. Steinhagen
Edward W. Yott
Their Attorney

United States Patent Office 3,183,962
Patented May 18, 1965

3,183,962
METHOD AND APPARATUS FOR
AIR CONDITIONING CARS
William K. Steinhagen, Royal Oak, and Edward W. Yott, St. Clair Shores, Mich., assignors to General Motors Corporation, Detroit, Mich., a corporation of Delaware
Filed Nov. 8, 1960, Ser. No. 68,125
14 Claims. (Cl. 165—3)

This invention relates to refrigerating apparatus and more particularly to an automobile air conditioning system.

It is an object of this invention to provide an air conditioning system for an automobile wherein automatic means are provided for controlling the air temperature and humidity in a manner to provide true comfort to a majority of people.

It has been found that controls which respond solely to the dry bulb temperature in the condition space are inadequate for providing proper comfort conditions within the space due to the fact that comfort is a function of temperature, humidity and air motion and all must be taken into consideration in order to provide an effective temperature which will give maximum comfort under all operating conditions. The problem of temperature control is further complicated by variations in the outside air temperature and in the wide variation in engine speeds without any regard for compressor requirements.

It is an object of this invention to provide a practical effective temperature control for an automobile air conditioning system which is suitable for both summer and winter operation under all environmental conditions.

It is another object of this invention to provide an improved control for an automobile air conditioning system which makes it possible to compensate for wide variations in the compressor output so as to maintain uniform comfort in the passenger compartment at all times.

Further objects and advantages of the present invention will be apparent from the following description, reference being had to the accompanying drawings wherein a preferred embodiment of the present invention is clearly shown.

Figure 1:
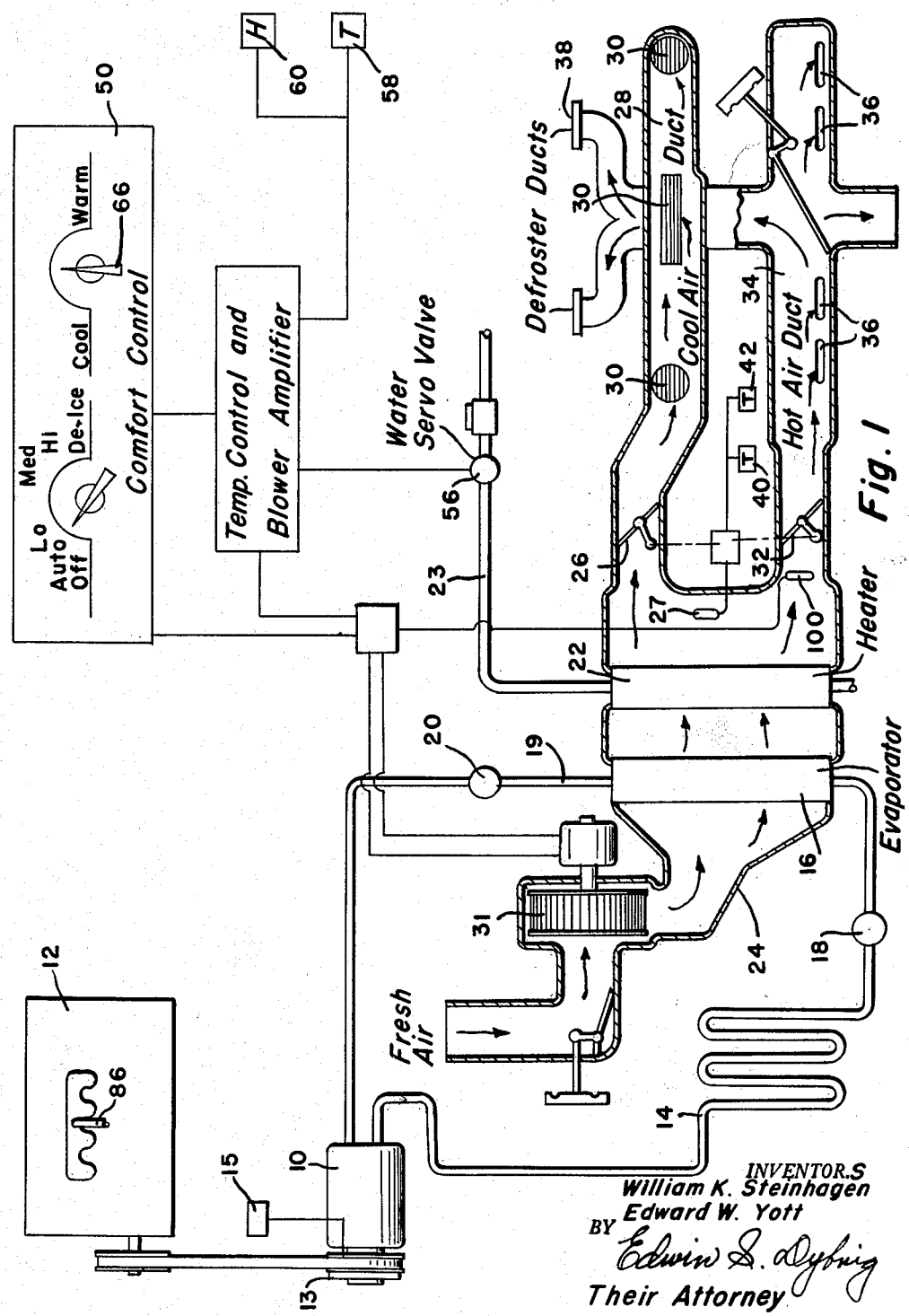
FIGURE 1 is a schematic view showing an automobile air conditioning system embodying the invention.
Figure 2:
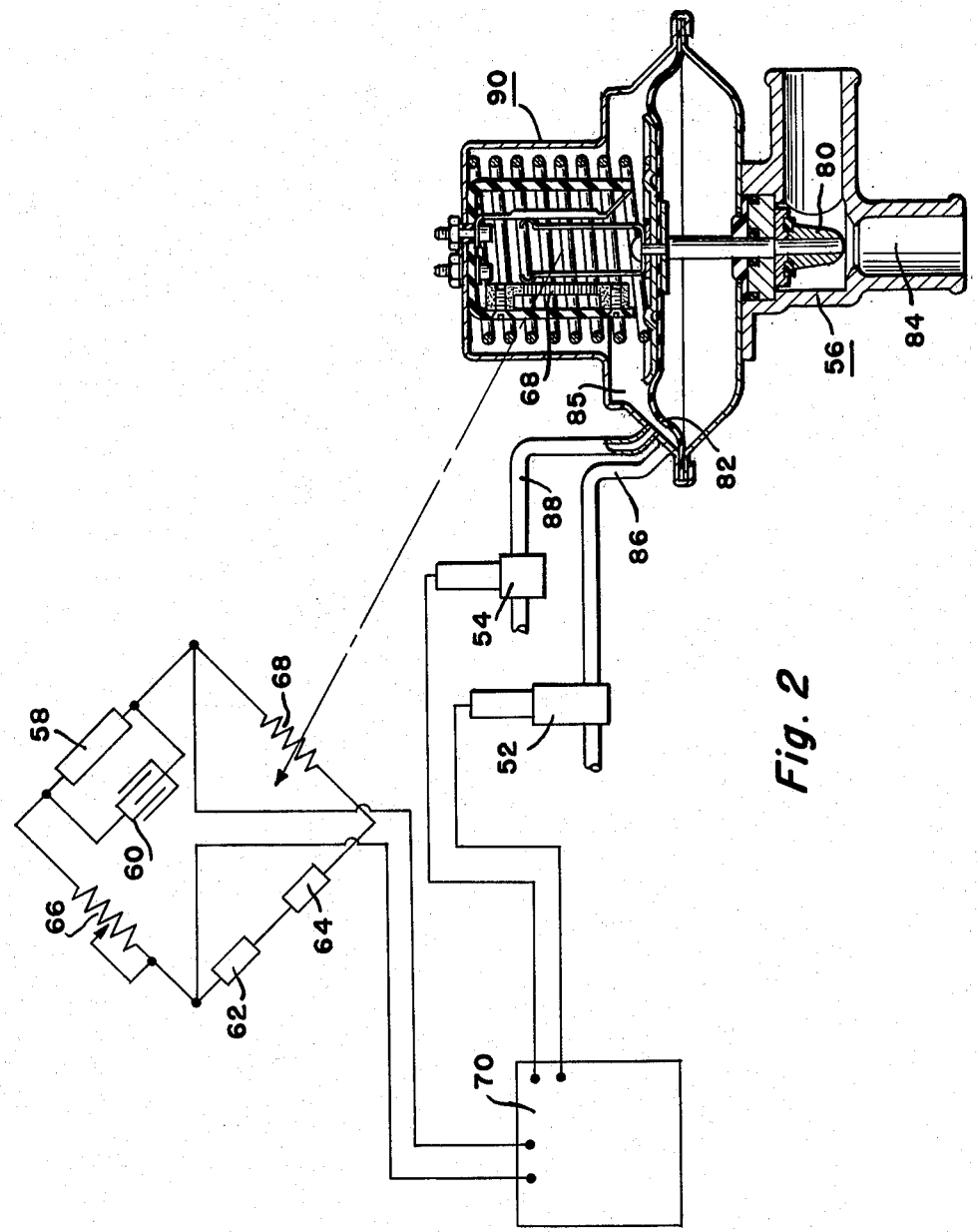
FIGURE 2 is a schematic view showing the electrical controls and the hot water servo valve in greater detail.

Referring now to FIGURE 1 of the drawings wherein a preferred embodiment of the invention has been shown, reference numeral 10 designates a refrigerant compressor which is adapted to be driven by means of the main car engine 12 at all times when the outside air temperature is above a predetermined value such as 32° F. and at speeds proportional to speeds of the car engine 12. For purposes of illustration there is shown a clutch 13 controlled by a thermostat 15 responsive to outside air temperature for declutching the compressor 10 from the engine 12 at temperatures below 32° F. The compressed refrigerant flows from the compressor 10 into conventional condenser 14 wherein the compressed refrigerant is condensed before being fed into the evaporator 16 through a conventional control such as a thermostatic expansion valve 18. The refrigerant vaporized in the evaporator 16 returns to the condenser through the suction line 19 in which there is mounted a suction throttling valve 20 which serves to throttle the suction on the evaporator at pressures which would tend to cause freeze-up of the evaporator 16. The refrigeration system thus far described is intended to utilize elements which are well known to those skilled in the art.

The evaporator 16 serves to cool the air to a temperature of approximately 35° F. and a moisture content of approximately fifty grains of moisture per pound of air. After having been thus cooled, the air is circulated through the heater coil 22 where the air is reheated to the desired temperature required for maintaining the correct in-car temperature. The heater 22 is of the type which utilizes hot water or other type of engine coolant liquid from the engine cooling system. The flow of hot water through the heater 22 is controlled by a water servo valve 56 located in the line 23 which conveys hot water from the engine cooling system to the heater core or coil 22. The in-car temperature control is obtained by modulating the engine coolant flow through the heater core.

The cooling coil 16 and the heater coil 22 are arranged in series in the air duct 24. A fan 31 is utilized for circulating the air to be conditioned in thermal exchange relationship with the evaporator 16 and thereafter the heater 22 before discharging the conditioned air into the passenger compartment. For purposes of illustration, an all fresh air system has been shown whereas many aspects of this invention are equally applicable to systems using recirculated air. During the cooling season when the main duct temperature thermostat 27 indicates that the duct temperature is below 75° F., the dampers 26 and 32 serve to direct the conditioned air through the duct 28 which is provided with air outlet grills 30 for discharging the conditioned air into the upper portion of the passenger compartment. When the main air duct temperature is above 75° F., the damper 26 will close and damper 32 will open so as to cause the heated air to be directed into the passenger compartment through the floor air outlets 36. In accordance with standard practice a portion of the hot air can be directed into the defroster ducts 38 when it is desired to provide hot air for defrosting the windshield. Override control thermostats 40 and 42 responsive to in-car temperature and outside air temperature respectively are provided for directing the air to the floor duct 34 when the in-car temperature is below 65° F. and to direct the air to the duct 28 when the outside temperature is above 75° F.

Basically, the operation of the automatic temperature control illustrated in the drawings is as follows. The effective temperature selector, generally designated by the reference numeral 50, controls two solenoid valves 52 and 54 which bleed vacuum into or out of the vacuum operated water servo valve 56. The temperature selector or control device 50 consists of a Wheatstone bridge type control wherein in-car temperature and humidity sensing devices 58 and 60, respectively, form an effective temperature sensing means in one leg of a balanced bridge circuit. The device 58 is a thermistor having a high temperature coefficient of resistance in which the resistance varies inversely with temperature. The humidity sensing element 60 is preferably of the type in which a hygroscopic film surface is provided in which the resistance varies inversely with the relative humidity in the surrounding air. Since humidity sensing elements of this type are well known and since the specific construction of the same forms no part of this invention, no further description thereof will be given.

Two additional compensating thermistors 62 and 64 are placed in series in the opposite leg of the control bridge circuit, as shown. These thermistors sense duct temperature and ambient temperature respectively. In addition, the control bridge circuit contains a calibrated potentiometer 66 which may be manually adjusted to select the temperature level to be maintained within the car. A feedback potentiometer or variable resistance element 68 is arranged in the fourth leg of the bridge circuit and is operated by and registers the position of the water servo valve 56.

An amplifier 70 is connected to the output of the above described bridge circuit and serves to amplify any bridge error signals to operate the pilot solenoid valves 52 and 54 on the servo valve 56. The amplifier 70 is a conventional phase sensitive amplifier and opens and closes the servo valves depending on which side of the null-point the bridge signal is generated. The water servo valve 56 is a pilot operated, vacuum modulated valve which regulates the flow of coolant through the heater coil 22. A tapered valve 80 attached to and positioned by a vacuum diaphragm 82 moves axially in the hot water passage 84, varying the flow orifice area. The valve is designed to positively close the flow in its one extreme position. As explained hereinabove, the control of the valve 80 is accomplished by the two pilot solenoid valves 52 and 54 which receive their signal from the amplifier and supply vacuum or bleed atmospheric air into the diaphragm cavity 85. Thus, the valve 52 is arranged in a line 86 which leads to the intake manifold of the main car engine 12. The valve 54 is arranged in the line 88 which serves to bleed atmospheric air into the space above the diaphragm 82 when the valve 54 is open. The position of the servo valve is indicated back to the control amplifier by means of a variable feedback potentiometer 90 which includes the resistance element 68 forming the fourth leg of the bridge circuit. The resistance of the element 68 changes as the valve 80 is moved up and down by means of the diaphragm 82.

Control is accomplished by maintaining a balanced bridge. If the resistance of the thermistor 58 and the humidity sensor 60 is high or low due to a deviation of control temperature, an unbalance of the bridge voltage will occur across the signal output. The voltage differential will cause the amplifier to drive the control valve 80, open or close, until the feedback potentiometer 90, attached thereto, rebalances the bridge.

Resistance values of the bridge circuit elements are provided such that control actuation is initiated with approximately 1° F. change in the passenger compartment. Thus, the device acts as a simple servo system; that is, the control valve position is proportional to the amount of deviation in the effective temperature sensor. The balance point of the bridge is considered a null point, and a 180° phase change occurs in the bridge signal output from temperature increase to temperature decrease and vice versa, to signal the amplifier whether to drive the control valve open or closed.

However, for automotive temperature control, such a simple sensing circuit is not sufficient for stable operation. The amount of heating or cooling required is not always proportional to the valve position, due to variations in capacity with changing engine speed and load and due to varying rate of heat loss from weather conditions and car body leaks. To correct for the nonlinear relationship, compensating sensors 62 and 64 are provided to adjust the signal gain. A modified signal, due to a change in compensating sensor resistance, will require a position change in the control valve 80 to alter the feedback potentiometer resistance and rebalance the bridge. The modified signal allows the servo to effect a capacity correction without altering in-car effective temperature. One of the compensating sensors 62 is a thermistor located in the air duct immediately down stream of the heater core, and the other is a thermistor 64 located in the outside ambient air in a position to allow sun radiation to strike it in all attitudes of the car. This thermistor could, for example, be located on the roof of the car, for example.

To maintain a balanced bridge, the total resistance across the duct and the outside thermistor is sensed. If the outside temperature does go down, the resistance of the outside thermistor 64 goes up. In order for the total resistance to remain equal, the temperature in the duct must go up, thus, lowering the resistance of the duct thermistor. Thus, the duct temperature change required to compensate for outside conditions has been proportioned as shown in the leg of the bridge circuit that contains these two elements 62 and 64. In addition to compensating for outside temperature conditions, the outside thermistor is arranged to receive heat from sun radiation with the result that a slight lowering of in-car temperature will take place to reduce the effect of sun radiation on the passengers.

The speed of the blower 31 is varied in the following manner. When the dampers 26 and 32 are arranged to direct the flow of air through the floor ducts, the duct thermostat 100 controls the speed of the blower so that the speed is directly proportional to the temperature of the air in the floor duct. When the dampers 26 and 32 are arranged to direct the air through the cool air duct, the speed of the blower is controlled by the amount the in-car effective temperature has deviated from the control point. While any conventional blower speed control means may be used to accomplish the above speed variation, the preferable arrangement is to use the same sensing elements for controlling the blower as are used to control other portions of the air conditioning system.

Various override controls can be added to those described herein. Thus, a thermostat could be placed in the engine coolant water line. If the air is directed to the floor duct 34, this thermostat would keep the blower and compressor clutch in the off position until the coolant water reaches some preselected value, for instance, 100° F., at which time, the system would be energized. If the air is directed to duct 28, the system would be immediately energized by this same thermostat.

While the embodiments of the present invention as herein disclosed, constitute preferred forms, it is to be understood that other forms might be adopted.

What is claimed is as follows:

1. Air conditioning equipment for an enclosure comprising in combination, an air duct communicating with said enclosure, a cooling coil in said duct, a heating coil in said duct, means for directing air to be conditioned in thermal exchange with said cooling coil and said heating coil so as to control the temperature in said enclosure, a combination temperature and humidity sensing instrument for controlling the resultant temperature change produced by said cooling coil and said heating coil on said air, said instrument including a resistance bridge having first and second opposite terminals and third and fourth opposite terminals, a phase sensitive amplifier having input terminals coupled to said first and second terminals, said bridge including a rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third thermistors connected between said first and fourth terminals, said second thermistor being responsive to the temperature of air outside said enclosure, said third thermistor being responsive to the temperature of the air leaving said coils, and a feedback potentiometer connected between said second and fourth terminals, a valve for regulating the output of said heating coil, and means operated by said amplifier for controlling said valve.

2. Air conditioning equipment for the passenger compartment of a vehicle comprising in combination, an air duct having an outlet communicating with said passenger compartment, a cooling coil and a heating coil disposed in said air duct, means for directing air to be conditioned in thermal exchange with said cooling coil and said heating coil so as to control the temperature in said compartment, means for controlling the resultant temperature change produced by said cooling coil and said heating coil on said air comprising a combination temperature and humidity sensing instrument, said instrument including a resistance bridge having first and second opposite terminals and third and fourth opposite terminals, a phase sensitive amplifier having input terminals coupled to said first and second terminals, said bridge including a manually adjustable rheostat connected between said first and third terminals, a first thermistor responsive to the temperature in said passenger compartment and connected between said second and third terminals, a humidity sensor in which the resistance varies inversely with the relative humidity in the condition space connected in parallel with said thermistor, second and third thermistors connected between said first and fourth terminals, said second thermistor being responsive to the temperature of air outside said passenger compartment, said third thermistor being responsive to the temperature of the air leaving said coils, a feedback potentiometer connected between said second and fourth terminals, a valve for regulating the output of said heating coil, and means operated by said amplifier for controlling said valve.

3. In a vehicle having an engine provided with an air intake manifold and having a passenger compartment, the combination, an air duct having an outlet communicating with said passenger compartment, a cooling coil in said duct, a heating coil in said duct, means for directing air to be conditioned in thermal exchange with said cooling coil and thereafter in thermal exchange with said heating coil so as to control the temperature in said compartment, means for controlling the resultant temperature change produced by said cooling coil and said heating coil on said air comprising a combination temperature and humidity sensing instrument, said instrument including a resistance bridge having opposite pairs of terminals, a phase sensitive amplifier having input terminals coupled to one pair of said terminals, said bridge including a manually adjustable rheostat connected between another pair of said terminals, a first thermistor responsive to the temperature in said passenger compartment and connected between another pair of said terminals, a humidity sensor in which the resistance varies inversely with the relative humidity in the condition space connected in parallel with said thermistor, second and third thermistors connected between still another pair of said terminals, said second thermistor being responsive to the temperature of air outside said passenger compartment, said third thermistor being responsive to the temperature of the air leaving said coils, and a feedback potentiometer connected between one pair of said terminals, a valve for regulating the output of said heating coil, means operated by said amplifier for controlling said valve, said valve controlling means including a pneumatically operated servo valve, said servo valve including a housing and a diaphragm disposed within said housing and arranged to operate said valve, means for connecting one side of said diaphragm to the intake manifold of said engine, and means for connecting the other side of said diaphragm to the outside atmosphere.

4. Air conditioning equipment for an enclosure comprising in combination, an air duct having an outlet communicating with said enclosure, a cooling coil in said duct, a heating coil in said duct, means for directing air to be conditioned in thermal exchange with said cooling coil and said heating coil, means for controlling the resultant temperature change produced by said cooling coil and said heating coil on said air comprising a combination temperature and humidity sensing instrument, said instrument including a resistance bridge having first and second opposite terminals and third and fourth opposite terminals, a phase sensitive amplifier having input terminals coupled to said first and second terminals, said bridge including a manually adjustable rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third thermistors connected between said first and fourth terminals, said second thermistor being responsive to the temperature of air outside said enclosure, said third thermistor being responsive to the temperature of the air leaving said coils, a valve for regulating the output of said heating coil, and means operated by said amplifier for controlling said valve.

5. Air conditioning equipment for an enclosure comprising in combination, an air duct having an outlet in said enclosure, a cooling coil and a heating coil disposed in said duct, means for directing air to be conditioned in thermal exchange with said cooling coil and said heating coil so as to control the temperature in said enclosure, means for controlling the resultant temperature change produced by said cooling coil and said heating coil on said air comprising a combination temperature and humidity sensing instrument, said instrument including a resistance bridge having first and second opposite terminals and third and fourth opposite terminals, a phase sensitive amplifier having input terminals coupled to said first and second terminals, said bridge including a manually adjustable rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third thermistors connected between said first and fourth terminals, said second thermistor being responsive to the temperature of air outside said enclosure, said third thermistor being responsive to the temperature of the air leaving said coils, a feedback potentiometer connected between said second and fourth terminals, a valve for regulating the output of said heating coil, and means operated by said amplifier for controlling said valve.

6. Air conditioning equipment for the passenger compartment of a vehicle comprising in combination, an air duct having an outlet communicating with said passenger compartment, a cooling coil in said duct, a heating coil in said duct, means for directing air to be conditioned in thermal exchange with said cooling coil and said heating coil so as to control the temperature in said compartment, means for controlling the resultant temperature change produced by said cooling coil and said heating coil on said air comprising a combination temperature and humidity sensing instrument, said instrument including a resistance bridge having first and second opposite terminals and third and fourth opposite terminals, a phase sensitive amplifier having input terminals coupled to said first and second terminals, said bridge including a manually adjustable rheostat connected between said first and third terminals, a first thermistor responsive to the temperature in said passenger compartment and connected between said second and third terminals, a humidity sensor in which the resistance varies inversely with the relative humidity in the condition space connected in parallel with said thermistor, second and third thermistors connected between said first and fourth terminals, said second thermistor being responsive to the temperature of air outside said passenger compartment, said third thermistor being responsive to the temperature of the air leaving said coils, a valve for regulating the output of said heating coil, a feedback potentiometer connected between said second and fourth terminals and connected to said valve so as to be adjusted in response to movement of said valve, and means operated by said amplifier for controlling said valve.

7. Air conditioning equipment for an enclosure comprising in combination, an air duct having multiple outlet means for selectively directing air into either the upper or lower position of said enclosure, a cooling coil in said duct, a heating coil in said duct, means for directing air to be conditioned in thermal exchange with said cooling coil and thereafter in thermal exchange with said heating coil so as to control the temperature and humidity of the air discharged into said enclosure, a combination temperature and humidity sensing instrument for controlling the resultant temperature change produced by said cooling coil and said heating coil on said air, said instrument including a resistance bridge having first and second opposite terminals and third and fourth opposite terminals, a phase sensitive amplifier having input terminals coupled to said first and second terminals, said bridge including a rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third themistors connected between said first and fourth terminals, said second thermistor being responsive to the temperature of air outside said enclosure, said third thermistor being responsive to the temperature of the air leaving said coils, a feedback potentiometer connected between said second and fourth terminals, a valve for regulating the output of said heating coil, means operated by said amplifier for controlling said valve, means whereby the conditioned air is directed into the lower portion of said enclosure whenever the air leaving said heating coil exceeds a predetermined temperature.

8. Air conditioning equipment for an enclosure comprising in combination, an air duct having multiple outlet means for selectively directing air into either the upper or lower portion of said enclosure, a cooling coil in said duct, a heating coil in said duct, means for directing air to be conditioned in thermal exchange with said cooling coil and thereafter in thermal exchange with said heating coil so as to control the temperature and humidity of the air discharged into said enclosure, a combination temperature and humidity sensing instrument for controlling the resultant temperature change produced by said cooling coil and said heating coil on said air, said instrument including a resistance bridge having first and second opposite terminals and third and fourth opposite terminals, a phase sensitive amplifier having input terminals coupled to said first and second terminals, said bridge including a rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third thermistors connected between said first and fourth terminals, said second thermistor being responsive to the temperature of air outside said enclosure, said third thermistor being responsive to the temperature of the air leaving said coils, a feedback potentiometer connected between said second and fourth terminals, a valve for regulating the output of said heating coil, means operated by said amplifier for controlling said valve, means whereby the conditioned air is directed into the upper portion of said enclosure whenever the air leaving said heating coil falls below a given value.

9. Air conditioning equipment for an enclosure comprising in combination, an air duct having multiple outlet means for selectively directing air into either the upper or lower portion of said enclosure, a cooling coil in said duct, a heating coil in said duct, means for directing air to be conditioned in thermal exchange with said cooling coil and thereafter in thermal exchange with said heating coil so as to control the temperature and humidity of the air discharged into said enclosure, a combination temperature and humidity sensing instrument for controlling the resultant temperature change produced by said cooling coil and said heating coil on said air, said instrument including a resistance bridge having first and second opposite terminals and third and fourth opposite terminals, a phase sensitive amplifier having input terminals coupled to said first and second terminals, said bridge including a rheostat connected between said first and third terminals, a first thermistor responsive to the temperature in said enclosure and connected between said second and third terminals, a humidity sensor in which the resistance varies inversely with the relative humidity in said enclosure connected in parallel with said thermistor, second and third thermistors connected between said first and fourth terminals, said second thermistor being responsive to the temperature of air outside said enclosure, said third thermistor being responsive to the temperature of the air leaving said coils, a feedback potentiometer connected between said second and fourth terminals, a valve for regulating the output of said heating coil, means operated by said amplifier for controlling said valve, means whereby the conditioned air is directed into the upper portion of said enclosure whenever the air leaving said heating coil falls below a given value, and means varying the rate of air flow into the upper portion of said enclosure in proportion to the deviation of the temperature of said reheated air from the desired air temperature in said enclosure.

10. Air conditioning equipment for an enclosure comprising in combination, an air duct having multiple outlet means for selectively directing air into either the upper or lower portion of said enclosure, a cooling coil in said duct, a heating coil in said duct, means for directing air to be conditioned in thermal exchange with said cooling coil and thereafter in thermal exchange with said heating coil so as to control the temperature in said compartment, a combination temperature and humidity sensing instrument for controlling the resultant air temperature change produced by said cooling coil and said heating coil, a valve for regulating the output of said heat coil, means operated by said instrument for controlling said valve, means for directing the conditioned air leaving said coils into said enclosure and means varying the rate of air flow in said duct in direct proportion to the deviation of the temperature of the air leaving said coils from the desired air temperature in said enclosure.

11. The method of conditioning air for the passenger compartment of a car which comprises, cooling a stream of air for said compartment to a temperature of approximately 35° F. and thereafter reheating the air a controlled amount to so condition said air so as to produce the desired temperature in the passenger compartment, directing the said reheated air adjacent the floor of said passenger compartment when the temperature of the reheated air is above 75° F. and directing the conditioned air into the upper portion of said compartment when the temperature of the reheated air is below 75°, and varying the rate of air flow discharged into the upper portion of said compartment directly in proportion to the deviation of the temperature of said reheated air from the desired passenger compartment temperature.

12. The method of conditioning air for the passenger compartment of a car which comprises, cooling a stream of air for said compartment to a temperature of approximately 35° F. and thereafter reheating the air a controlled amount to so condition said air so as to produce the desired temperature in the passenger compartment, directing said reheated air adjacent the floor of said passenger compartment when the temperature of the reheated air is above 75° F. and directing the conditioned air into the upper portion of said compartment when the temperature of the reheated air is below 75°, varying the rate of air flow when air is discharged into the upper portion of said compartment directly in proportion to the deviation of the temperature of said reheated air from the desired passenger compartment temperature, and varying the rate of air flow when air is discharged into the lower portion of said compartment in direct proportion to the temperature of said reheated air.

13. The method of conditioning air for the passenger compartment of a car which comprises, cooling a stream of air for said compartment to a first predetermined temperature and thereafter reheating the air a controlled amount to condition said air to produce a second predetermined temperature in the passenger compartment, directing said reheated air adjacent the floor of the passenger compartment when the temperature of the reheated air is above a third predetermined temperature and directing the conditioned air into the upper portion of the passenger compartment when the temperature of the reheated air is below said third predetermined temperature, and varying the rate of air flow discharged into the upper portion of the compartment directly in proportion to the deviation of the temperature of said reheated air from the second predetermined compartment temperature.

14. The method of conditioning air for the passenger compartment of a car which comprises, cooling a stream of air for the compartment to a first predetermined temperature and thereafter reheating the air a controlled amount to so condition said air so as to produce a second predetermined temperature in the passenger compartment, directing said reheated air adjacent the floor of the passenger compartment when the temperature of the reheated air is above a third predetermined temperature and directing the conditioned air into the upper portion of the compartment when the temperature of the reheated air is below the third predetermined temperature, varying the rate of air flow when air is discharged into the upper portion of said compartment directly in proportion to the deviation of the temperature of the reheated air from the second predetermined passenger compartment temperature, and varying the rate of air flow when air is discharged into the lower portion of the compartment in direct proportion to the temperature of the reheated air.

References Cited by the Examiner
UNITED STATES PATENTS

| | | | |
|---|---|---|---|
| 2,212,503 | 8/40 | Nickell | 165—27 |
| 2,254,185 | 8/41 | Newton | 165—20 |
| 2,828,464 | 3/58 | Nixon et al. | 236—44 |

CHARLES SUKALO, *Primary Examiner.*

HERBERT L. MARTIN, *Examiner.*